United States Patent
Forbert et al.

(10) Patent No.: US 9,643,122 B2
(45) Date of Patent: May 9, 2017

(54) SEPARATION DEVICE FOR CARBON DIOXIDE, METHOD FOR THE OPERATION THEREOF, AND SEPARATING UNIT

(71) Applicant: Siemens Aktiengesellschaft, Munich (DE)

(72) Inventors: Rainald Forbert, Moosburg (DE); Stefan Hauke, Einhausen (DE); Ralph Joh, Seligenstadt (DE); Markus Kinzl, Dietzenbach (DE); Rudiger Schneider, Eppstein (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 369 days.

(21) Appl. No.: 14/394,095

(22) PCT Filed: Apr. 2, 2013

(86) PCT No.: PCT/EP2013/056922
§ 371 (c)(1),
(2) Date: Oct. 12, 2014

(87) PCT Pub. No.: WO2013/156300
PCT Pub. Date: Oct. 24, 2013

(65) Prior Publication Data
US 2015/0075376 A1    Mar. 19, 2015

(30) Foreign Application Priority Data
Apr. 18, 2012  (EP) .................... 12164560

(51) Int. Cl.
B01D 53/14    (2006.01)
B01D 9/00     (2006.01)
(Continued)

(52) U.S. Cl.
CPC ....... B01D 53/1425 (2013.01); B01D 9/0013 (2013.01); B01D 9/0036 (2013.01);
(Continued)

(58) Field of Classification Search
CPC combination set(s) only.
See application file for complete search history.

(56) References Cited

U.S. PATENT DOCUMENTS 3,530,924 A    9/1970  Domning Hans
3,799,749 A    3/1974  Moyer
(Continued)

FOREIGN PATENT DOCUMENTS

CN    1369025 A    9/2002
EA    014913 B1    2/2011
(Continued)

OTHER PUBLICATIONS

KR Notice of Allowance dated Nov. 29, 2016, for KR patent application No. 10-2014-7029177.
RU Patent Grant dated Feb. 3, 2017, for RU patent application No. 2014146207.

*Primary Examiner* — Duane Smith
*Assistant Examiner* — Adam W Bergfelder
(74) *Attorney, Agent, or Firm* — Beusse Wolter Sanks & Maire

(57) ABSTRACT

A device and method for separating off carbon dioxide is provided, including an absorption unit, desorption unit assigned thereto and a separation unit for separating off salts from a scrubbing solution. The absorption and desorption units are connected to each other via a first conduit for a regenerated scrubbing solution and a second conduit for a loaded scrubbing solution. The separation unit includes a crystallizer for forming salt crystals and a first separator unit on the downstream side for separating off salt crystals. A separation unit is provided for separating off salts from a (Continued)

scrubbing solution, having a crystallizer and a first separator unit downstream thereof. The crystallizer has a crystallization chamber for forming salt crystals and a countercurrent classifier for separating salt crystals according to particle size. A first branch conduit is connected to the crystallization chamber, which opens out into the countercurrent classifier via a second separator unit.

15 Claims, 1 Drawing Sheet

(51) Int. Cl.
*B01D 53/96* (2006.01)
*B01D 53/62* (2006.01)

(52) U.S. Cl.
CPC ....... *B01D 9/0059* (2013.01); *B01D 53/1475* (2013.01); *B01D 53/62* (2013.01); *B01D 53/96* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

| | | |
|---|---|---|
| 4,389,383 A | 6/1983 | Sokolik, Jr. et al. |
| 6,464,736 B1 | 10/2002 | Hazen et al. |
| 2004/0253159 A1* | 12/2004 | Hakka ................ B01D 53/1475 423/228 |
| 2006/0193765 A1 | 8/2006 | Nakashima et al. |
| 2007/0148068 A1 | 6/2007 | Chakravarti |
| 2010/0024172 A1 | 2/2010 | Ekkelenkamp |
| 2010/0083666 A1 | 4/2010 | Brook et al. |
| 2011/0277479 A1 | 11/2011 | Richter et al. |

FOREIGN PATENT DOCUMENTS

| | | |
|---|---|---|
| EP | 0040892 A1 | 12/1981 |
| EP | 2409755 A1 | 1/2012 |
| JP | 2006348253 A | 12/2006 |
| KR | 20090038474 A | 4/2009 |
| KR | 20110110244 A | 10/2011 |
| WO | 2004067139 A1 | 8/2004 |

* cited by examiner

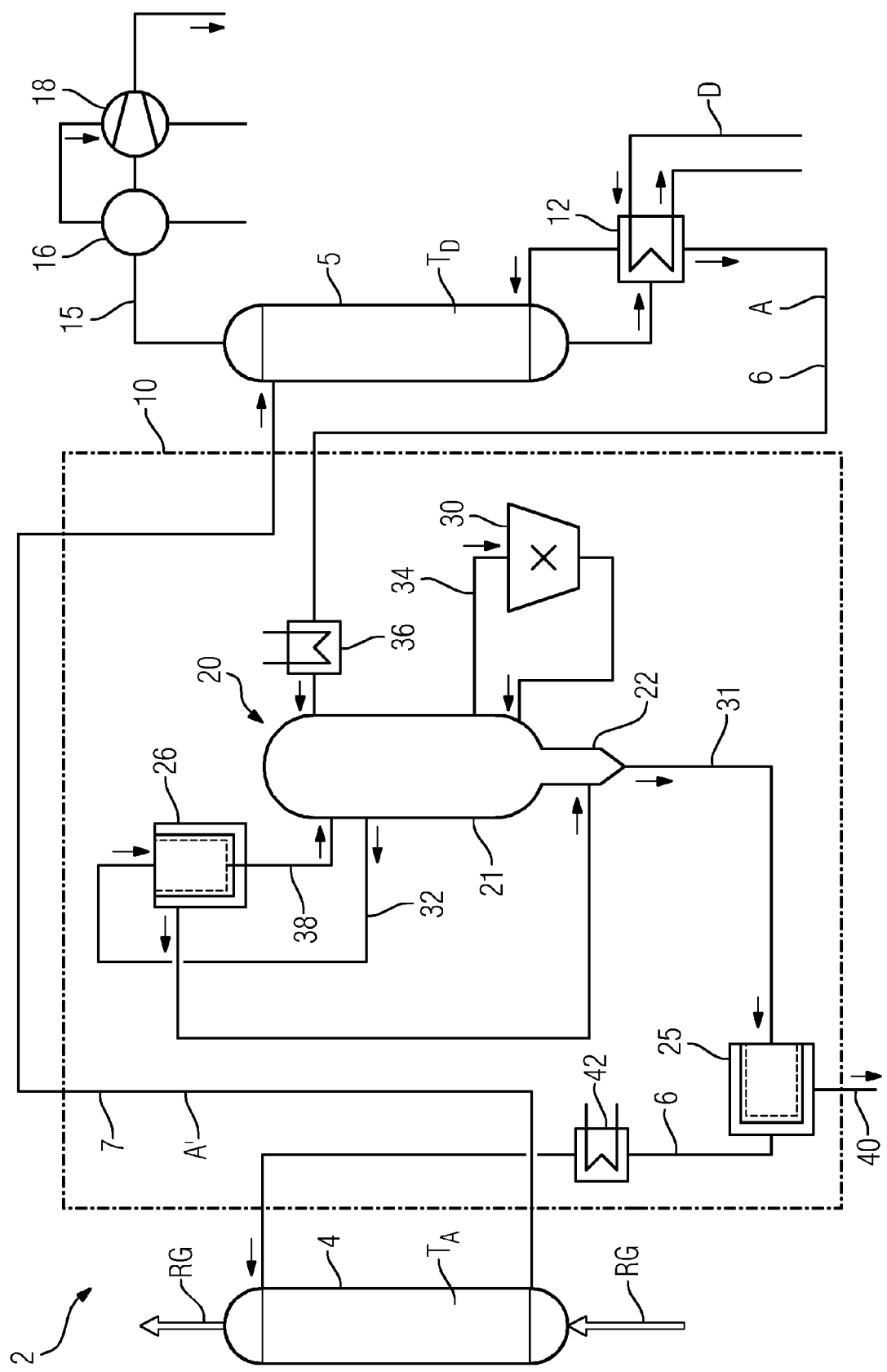

SEPARATION DEVICE FOR CARBON DIOXIDE, METHOD FOR THE OPERATION THEREOF, AND SEPARATING UNIT

CROSS REFERENCE TO RELATED APPLICATIONS

This application is the U.S. National Stage of International Application No. PCT/EP2013/056922 filed Apr. 2, 2013, and claims the benefit thereof. The International Application claims the benefit of European Application No. EP12164560 filed Apr. 18, 2012. All of the applications are incorporated by reference herein in their entirety.

FIELD OF INVENTION

The invention relates to a device for separating off carbon dioxide, in particular from a flue gas of a fossil-fuelled power plant, and to a method for operating such a separation device. The invention further relates to a separation unit for separating off salts from a scrubbing solution.

BACKGROUND OF INVENTION

In a fossil-fuelled power plant for generating electrical energy, owing to the combustion of a fossil fuel, a carbon dioxide-containing flue gas is formed. In addition to carbon dioxide, the flue gas contains further combustion products such as, for example, the gases sulfur dioxide and nitrogen dioxide, and solid particles, dust and soot. The flue gas is usually released into the atmosphere after a thorough separation of the solid components.

The increase in the fraction of carbon dioxide in the earth's atmosphere caused by humans, however, is considered to be responsible, as the main cause of the increase in the temperatures at the earth's surface called climate change. This is because carbon dioxide situated in the atmosphere prevents heat emission from the surface of the earth into space, which is generally termed the greenhouse effect.

In this respect, secondary measures suitable in existing power plants are being discussed in order to remove the carbon dioxide formed after the combustion from the flue gas. As a technical possibility for separating off carbon dioxide from the flue gas after a combustion process (post-combustion capture), for this purpose the flue gas is contacted with a scrubbing solution that is admixed with a suitable absorbent for carbon dioxide. In this case, the carbon dioxide is scrubbed out of the flue gas.

In a classical absorption-desorption process, the flue gas in this case is contacted in an absorption unit with the scrubbing solution, whereby, in particular, carbon dioxide is absorbed or reversibly bound. The flue gas purified in this manner is allowed out of the absorption unit, whereas the carbon dioxide-loaded scrubbing solution is passed into a desorption unit for separating off the carbon dioxide and regenerating the scrubbing solution. In the desorption unit, usually a thermal separation proceeds, that is to say the carbon dioxide is desorbed by supplying heat. The carbon dioxide is finally compressed, for example in many stages, and cooled and supplied to a store or utilization. The regenerated scrubbing solution is returned to the absorption unit, where it is available again for absorption of carbon dioxide.

In the context of such an absorption-desorption process, usually a chemical absorption using a basic scrubbing solution is used. In such an absorption, the acid flue gas components react with the basic absorbent present in the scrubbing solution. Currently, the most promising absorbents appear to be amine-containing absorbents, where, as amines, in particular alkanolamines, but also more complex sterically hindered amines having large alkyl groups, cyclic amines, amino acids or amino acid salts are used. The amines used form, together with carbon dioxide, either carbamates, or the carbon dioxide reacts in the scrubbing solution indirectly to form hydrogen carbonate and a protonated amine.

Undesirably, in an amine-containing scrubbing solution, in addition to carbon dioxide, other acid gases are also absorbed, in particular nitrogen oxides and/or sulfur oxides. In contrast to carbon dioxide, the further gases, however, with the amine-containing absorbents form, inter alia, heat stable salts (HSS) which can no longer be converted back in the desorption unit. These heat stable salts successively reduce the capacity of the scrubbing solution for absorption of carbon dioxide during operation owing to the decrease in amine concentration caused thereby. Furthermore, they may promote corrosion and adversely affect the flow properties of the scrubbing solution.

SUMMARY OF INVENTION

Therefore, it is a first object of the invention to specify a device for separating off carbon dioxide, in particular from a flue gas of a fossil-fuelled power plant which allows salt to be separated off from a scrubbing solution.

It is a second object of the invention to provide a method for separating off carbon dioxide, in particular from a flue gas of a fossil-fuelled power plant, by which salts can be separated off from a scrubbing solution.

A third object of the invention is to specify a separation unit for separating off salts from a scrubbing solution.

The first object is achieved according to the invention by the features of the independent claims. Advantageous embodiments and developments of the invention are described in the subclaims and the description hereinafter.

Accordingly, the device according to aspects of the invention, for separating off carbon dioxide, in particular from a flue gas of a fossil-fuelled power plant, comprises an absorption unit, a desorption unit assigned to the absorption unit, and a separation unit for separating off salts from a scrubbing solution. The absorption unit and the desorption unit are connected to each other via a first conduit for a regenerated scrubbing solution and a second conduit for a loaded scrubbing solution. The separation unit comprises a crystallizer for forming salt crystals and a first separator unit on the downstream side thereof for separating off the salt crystals.

The invention proceeds in this case from the consideration that the salts formed by neutralization reaction of an amine-containing scrubbing solution with acid flue gas components cannot be reformed and they decrease the capacity of the scrubbing solution for absorption of carbon dioxide. The invention further proceeds from the consideration to crystallize the salts in the scrubbing solution. The thus crystallized salts may then be relatively easily removed from the scrubbing solution as solids. Therefore, the invention envisages feeding the scrubbing solution to a separation unit in which the salts present in the scrubbing solution are crystallized by means of a crystallizer and the salt crystals formed are removed from the scrubbing solution by means of a separator unit. This permits salts present in the scrubbing solution to be separated off and thus a simple treatment of the scrubbing solution.

The absorption unit serves for the absorption of the carbon dioxide by the scrubbing solution, and the desorption unit serves for the desorption of the carbon dioxide. The first conduit connects the desorption unit to the absorption unit and conducts the regenerated scrubbing solution. The second conduit connects the absorption unit to the desorption unit and conducts the loaded scrubbing solution. For separating off salts, the separation unit can be directly integrated into the separation device. However, it is equally possible to withdraw the scrubbing solution from the separation device, convey it separately to the separation unit, and after the salts have been separated off, to reuse the scrubbing solution in the separation device.

Nucleation and salt crystal growth proceed for the most part in the crystallizer. In this case, supersaturation is the driving force of crystallization. In addition to evaporation of the scrubbing solution, supersaturation can be generated, in particular, by cooling the scrubbing solution. Owing to an appropriately low temperature, the solubility of the salts in the scrubbing solution decreases and the salts that are to be crystallized out are brought into supersaturation. Crystal formation of the salts is made possible as a result.

The crystallizer is advantageously a crystallizer for continuous crystallization, that is to say for continuous operation. The crystallizer can comprise, for example, an agitator or a circulation pump and a device for heating and/or cooling. In this case, the principal task of the agitator and/or of the circulation pump is to distribute the suspension as homogeneously as possible and to mix in the scrubbing solution fed from the desorption unit. The device for cooling can serve, in particular, for lowering the temperature of the scrubbing solution.

The particle size of the salt crystals may be controlled, in particular, via the local and average supersaturation, and also the distribution and residence time of the salt crystals in the supersaturated solution. Within the scrubbing solution, in particular small, medium and large salt crystals can be present, where this subdivision must be considered in each case in relation to the salt crystals to one another. In other words, the small salt crystals are smaller than the medium salt crystals and the medium salt crystals are again smaller than the large salt crystals.

The first separator unit is flow-connected downstream of the crystallizer and is constructed for separating off from the scrubbing solution the salt crystals that are formed. The salt crystals that are separated off by the first separator unit are fed to a store, disposal or utilization. Alternatively, in particular medium and small salt crystals can be fed back completely or in part to the crystallizer in order to maintain an appropriate solids concentration in the crystallizer, which has a beneficial effect on the crystallization performance of the crystallizer. The scrubbing solution, which as far as possible no longer contains salt crystals, is transported to the absorption unit or fed thereto.

The specified device for separating off has the advantage that salts can be separated off from a scrubbing solution thereby. The device for separating off enables salts that are dissolved in a scrubbing solution to crystallize out and thus be present in the scrubbing solution as solids, whereby they can then be separated from the scrubbing solution by a first separator unit via a relatively simple solid/liquid separation.

The carbon dioxide present in the loaded scrubbing solution promotes the solubility of the salts in the scrubbing solution and therefore makes crystallization of the salts difficult. Advantageously, therefore, the regenerated scrubbing solution from the desorption unit is transported to the separation unit or fed thereto.

Expediently, the separation unit is therefore connected into the first conduit. The first conduit connects in this case the desorption unit to the separation unit, and this in turn to the absorption unit. In this manner, the separation unit is connected directly into the circulating circuit of the scrubbing solution between absorption unit and desorption unit.

In an advantageous embodiment, the crystallizer comprises a crystallization chamber for forming the salt crystals, and a classifying appliance for separating the salt crystals according to their particle size. The crystallization chamber consists in this case of a substantially cylindrical container in which are situated the scrubbing solution and the growing salt crystals. In the classifying appliance, the salt crystals are separated according to their particle size. In this case, the large salt crystals are substantially separated from the medium and small salt crystals. Via the separation, a more targeted withdrawal, especially of the large salt crystals, which can be more easily separated from the scrubbing solution, is simplified, and the medium and small salt crystals can remain in the crystallization chamber for further growth. Advantageously, the regenerated scrubbing solution, before it is passed into the crystallizer of the separation unit, has been brought to a low temperature, in particular to 10° C.-15° C., for example by a heat exchanger. The crystal formation of the salts may be made possible or promoted thereby.

Expediently, the classifying appliance is constructed as a countercurrent classifier. In this case the classifying appliance is molded on the base side of the crystallization chamber and itself comprises a substantially hollow cylindrical body having a base running in particular in a funnel shape. On the shell surface of the hollow cylindrical body, in the lower region in the vicinity of the base, an inlet opening is provided via which a counterflow is introduced which flows through the hollow cylindrical body from the inlet opening upwards in the direction of the crystallization chamber. For separation of the salt crystals according to the particle size thereof, in this case the differing falling velocities of the salt crystals of differing particle sizes are utilized, wherein the falling velocity of the large salt crystals is greater than the falling velocity of the medium and small salt crystals. The salt crystals which have a falling velocity less than the velocity of the counterflow are transported upwards by the counterflow in the direction of the crystallization chamber. Salt crystals having a higher falling velocity move downwards through the hollow cylindrical body and collect at the base of the classifying appliance. Therefore, the velocity of the counterflow is adjusted in such a manner that it is less than the falling velocity of the large salt crystals but greater than the falling velocity of the medium and small salt crystals. Therefore, at the base of the classifying appliance, principally large salt crystals collect, which can be taken off from there.

Advantageously, a first branch conduit is connected to the crystallization chamber, which first branch conduit opens out into the countercurrent classifier via a second separator unit. The first branch conduit serves for removal of scrubbing solution from the crystallization chamber and supply to the second separator unit and to the downstream countercurrent classifier. The second separator unit is arranged in this case in such a manner that it retains, in particular, large and medium salt crystals which are situated in the scrubbing solution that is taken off. These retained salt crystals are fed back to the crystallization chamber in order to maintain an appropriate solids concentration within the scrubbing solution, which has a beneficial effect on the crystallization performance of the crystallizer. The scrubbing solution substantially only containing small salt crystals is passed from the second separator unit via the first branch conduit into the inlet opening of the countercurrent classifier, where it acts as counterflow.

The second separator unit is expediently constructed as a filter. In this case it can be, in particular, a continuously operating filter, such as, for example, an edge-split filter. Alternatively, the second separator unit can also be constructed as a hydrocyclone or a separator.

In an expedient embodiment, the first separator unit comprises a centrifuge which can be, in particular, a screen centrifuge. This separates, in particular, the large salt particles from the scrubbing solution. In addition, the first separator unit can further comprise a filter which separates any medium and small salt crystals still present from the scrubbing solution. Instead of the combination of screen centrifuge and filter, it is also possible, in particular, that the first separator unit comprises, for example, a worm/screen centrifuge which combines both functions therein.

In an advantageous embodiment, a second branch conduit is connected to the crystallizer, which second branch conduit is returned back to the crystallizer via a comminution appliance. In this manner scrubbing solution can be taken off continuously or periodically from the crystallizer via the second branch conduit and the salt crystals present therein can be subjected to a comminution process in the comminution appliance, for example a mill or a disperser. The second branch conduit is arranged in such a manner that the comminuted salt crystals can then be fed back to the crystallizer together with the scrubbing solution. In this manner, more small salt crystals which can grow can be made available to the crystallizer, whereby the crystallization performance of the crystallizer is increased.

Advantageously, a first feed appliance for seed crystals is provided within the separation unit. The seed crystals can be added to the scrubbing solution in the crystallizer. There, they grow by crystallization.

Advantageously, within the separation unit, a second feed appliance for a base, in particular potassium hydroxide, is provided. By addition of a base to the scrubbing medium, protons can be captured which are formed by the absorption of acid gas and the formation of salts.

Downstream of the first separator unit is advantageously connected a "safety" filter. By way of the "safety" filter, salt crystals which were not separated off by the first separator unit can be retained.

The second object of the invention is achieved according to embodiments of the invention by the features of the independent claims. Advantageous embodiments and developments of the invention are described in the subclaims and the description hereinafter.

In the method according to the invention for separating off carbon dioxide, in particular from a flue gas of a fossil-fuelled power plant, a loaded scrubbing solution is conducted from an absorption unit to a desorption unit, and a regenerated scrubbing solution is conducted from the desorption unit to the absorption unit. In this process the scrubbing solution is fed to a separation unit in which, by means of a crystallizer, salt crystals are formed in the scrubbing solution and are separated off by means of a downstream separator unit.

Advantageously, the regenerated scrubbing solution is treated using the separation unit.

In the absorption unit, the scrubbing solution is enriched with carbon dioxide by absorption thereof. The scrubbing solution thus loaded is fed via a conduit to the desorption unit. In the desorption unit the carbon dioxide is desorbed and advantageously the scrubbing solution which is regenerated in this manner is fed to the separation unit and then to the absorption unit.

The nucleation and salt crystal growth principally proceed in the continuously operating crystallizer, in which a suspension of scrubbing solution and salt crystals is in particular homogeneously distributed and newly fed scrubbing solution is admixed.

The particle size of the salt crystals is controlled, in particular, via the local and average supersaturation, and also the distribution and residence time of the crystals in the supersaturated solution. In the scrubbing solution, in particular small, medium and large salt crystals are present. This classification must be considered in each case in relation to the salt crystals to one another, that is to say that the small salt crystals are smaller than the medium salt crystals, and the medium salt crystals are in turn smaller than the large salt crystals.

By means of a separator unit flow-connected downstream of the crystallizer, salt crystals formed are separated off from the scrubbing solution. For this purpose, a scrubbing solution, in particular containing large salt crystals, is withdrawn from the crystallizer and fed to the separator unit. The salt crystals that are separated off by the separator unit are fed to a store, disposal or utilization. Alternatively, in particular medium and small salt crystals can be completely or partially returned to the crystallizer in order to maintain an appropriate solids concentration in the crystallizer, which has a beneficial effect on the crystallization performance of the crystallizer. In the crystallizer, these medium and small salt crystals then grow further. The scrubbing solution, which as far as possible no longer contains salt crystals, is fed to the absorption unit.

The method described has the advantage that salts can be separated off thereby from a scrubbing solution. By way of the method, the salts dissolved in a scrubbing solution can be crystallized out and separated from the scrubbing solution as solids via a relatively simple solid/liquid separation.

In an advantageous procedure of the method, the salt crystals are formed in a crystallization chamber of the crystallizer and are separated according to their particle size in a classifying appliance of the crystallizer. The scrubbing solution with growing salt crystals is situated in the crystallization chamber. In the classifying appliance the salt crystals are separated according to the particle size thereof. In this case, the large salt crystals which can be separated off more easily from the scrubbing solution are substantially separated from the medium and small salt crystals. Via this separation, especially the large salt crystals can be withdrawn in a targeted manner, wherein the medium and small salt crystals remain in the crystallization chamber and grow further. Advantageously, the regenerated scrubbing solution, before it is passed into the crystallizer of the separation unit, is brought to a low temperature, in particular to 10° C.-15° C. Owing to an appropriately low temperature, the solubility of the salts in the scrubbing solution falls and the salts that are to be crystallized out are brought into supersaturation. As a result, the crystal formation of the salts is enabled and/or promoted.

Expediently the salt crystals are separated according to their particle size by means of a counterflow. For this purpose, a counterflow flows through the classifying appliance against the direction of fall of the salt crystals. In this case the velocity of the counterflow is adjusted in such a manner that it is smaller than the falling velocity of the large salt crystals, but greater than the falling velocity of the medium and small salt crystals. Medium and small salt crystals, the falling velocity of which is lower than the velocity of the counterflow, are transported upward by the counterflow in the direction of the crystallization chamber. The large salt crystals, the falling velocity of which is greater than the velocity of the counterflow, fall downwards and collect at the base of the classifying appliance. As a result, substantially large salt crystals collect at the base of the classifying appliance, which salt crystals are taken off from there.

Advantageously, a first substream of the scrubbing solution is taken off from the crystallization chamber and salt crystals present in the first substream are separated off, wherein the first substream is fed as counterflow to the classifying appliance. In this case, after withdrawal from the crystallization chamber, first, in particular large and medium salt crystals which are situated in the scrubbing solution that is withdrawn are separated off. These salt crystals are fed back to the crystallization chamber and there grow further. The substream now principally only containing small salt crystals is then passed into the classifying appliance as counterflow.

Expediently, filtration is performed for separating off the salt crystals from the first substream, as a result of which, in particular, large and medium salt crystals are separated off from the first substream. These large and medium salt crystals that are separated off are fed back to the crystallizer for further growth.

Expediently, centrifugation is performed for separating off the salt crystals by means of the separator unit. In this case, the salt particles are principally separated off from the scrubbing solution by a rotating drum, exploiting centrifugal force. The scrubbing solution can optionally be further filtered, in order to separate off as completely as possible any salt particles still present therein.

Advantageously, a second substream of the scrubbing solution is taken off from the crystallizer; salt crystals present in the second substream are comminuted, and the second substream is returned back to the crystallizer. This operation can be carried out continuously or periodically. In this manner, more small salt crystals that can grow are made available to the crystallizer, as a result of which the crystallization performance of the crystallizer is increased.

Advantageously, seed crystals are additionally added to the scrubbing solution in the crystallizer, which seed crystals grow further in the crystallizer.

Advantageously, a base, in particular potassium hydroxide, is added to the scrubbing solution. By means of the addition of a base, protons can be trapped, which protons are formed by the absorption of acid gases and the formation of the salts.

The scrubbing solution can be further filtered after it passes through the separator unit. As a result, salt crystals that were not separated off by the first separator unit can be retained.

The third object of the invention is achieved according to aspects of the invention by the features of the independent claims. Advantageous embodiments and developments of the invention are described in the subclaims and the description hereinafter.

Accordingly, the separation unit according to the invention comprises, for separating off salts from a scrubbing solution, a crystallizer and a first separator unit downstream thereof for separating off salt crystals. The crystallizer comprises a crystallization chamber for forming the salt crystals and a countercurrent classifier for separating the salt crystals according to their particle size. A first branch conduit is connected to the crystallization chamber, which first branch conduit opens out into the countercurrent classifier via a second separator unit.

The scrubbing solution is a regenerated scrubbing solution for separating off carbon dioxide, in particular from a flue gas of a fossil-fuelled power plant. The carbon dioxide has already been desorbed from the scrubbing solution. This scrubbing solution is fed to the separation unit.

The particle size of the salt crystals may be controlled, in particular, via the local and average supersaturation and the distribution and residence time of the salt crystals in the supersaturated scrubbing solution. Within the scrubbing solution, in particular small, medium and large salt crystals can be present, wherein this subdivision must be considered in each case in relation to the salt crystals to one another. In other words, the small salt crystals are smaller than the medium salt crystals, and the medium salt crystals are in turn smaller than the large salt crystals.

The nucleation and salt crystal growth principally proceed in the crystallizer, in which a suspension of scrubbing solution and salt crystals is, in particular, homogeneously distributed, and newly fed scrubbing solution is admixed.

The crystallizer is advantageously a crystallizer for continuous crystallization, that is to say for continuous operation. The crystallizer can comprise, for example, an agitator or a circulation pump, and a device for heating and/or cooling. In this case, the principal task of the agitator and/or the circulation pump is to distribute the suspension of scrubbing solution and salt crystals as homogeneously as possible and to admix the scrubbing solution that is fed. The device for cooling can serve, in particular, for lowering the temperature of the scrubbing solution.

The crystallization chamber consists of a substantially cylindrical container in which the scrubbing solution and the growing salt crystals are situated. In the classifying appliance, the salt crystals are separated according to the particle size thereof. In this case, the large salt crystals are substantially separated from the medium and small salt crystals. Owing to the separation, a more targeted withdrawal, primarily the large salt crystals that can be separated more readily from the scrubbing solution, is simplified, and the medium and small salt crystals can remain in the crystallization chamber for further growth. Advantageously, the scrubbing solution, before it is passed into the crystallizer, has been brought to a low temperature, in particular to 10° C.-15° C., for example by a heat exchanger. As a result, crystal formation of the salts can be enabled and/or promoted.

The countercurrent classifier is molded on the base side of the crystallization chamber and itself comprises a substantially hollow cylindrical body having a base running in particular in a funnel shape. On the shell surface of the hollow cylindrical body, in the lower region in the vicinity of the base, an inlet opening is provided, via which a counterflow is introduced, which flows through the hollow cylindrical body from the inlet opening upwards in the direction of the crystallization chamber. To separate the salt crystals in accordance with the particle size thereof, in this case the differing falling velocities of the salt crystals having differing particle sizes are exploited, wherein the falling velocity of the large salt crystals is greater than the falling velocity of the medium and small salt crystals. The salt crystals, the falling velocity of which is less than the velocity of the counterflow, are transported by the counterflow upwards in the direction of the crystallization chamber. Salt crystals having a higher falling velocity move through the hollow cylindrical body downwards and collect at the base of the classifying appliance. In this case, the velocity of the counterflow is adjusted in such a manner that it is less than the falling velocity of the large salt crystals, but greater than the falling velocity of the medium and small salt crystals. Therefore, at the base of the classifying appliance, principally large salt crystals collect, which can be taken off therefrom.

The first branch conduit serves for withdrawal of scrubbing solution from the crystallization chamber and feeding it to the second separator unit and to the downstream countercurrent classifier. The second separator unit in this case is arranged in such a manner that it retains, in particular, large and medium salt crystals which are situated in the scrubbing solution that is withdrawn. These retained salt crystals are advantageously fed by a separate conduit back to the crystallization chamber in order to maintain an appropriate solids concentration within the scrubbing solution, which has a beneficial effect on the crystallization performance of the crystallizer. The scrubbing solution now principally only containing small salt crystals is passed out of the second separator unit via the first branch conduit into the inlet opening of the countercurrent classifier, where it acts as counterflow.

The first separator unit is constructed for separating off from the scrubbing solution the salt crystals that are formed. The salt crystals separated off by the first separator unit are fed to a store, disposal or utilization. Alternatively, in particular medium and small salt crystals can be fed in whole or in part back to the crystallizer, in order to maintain an appropriate solids concentration in the crystallizer, which has a beneficial effect on the crystallization performance of the crystallizer. The scrubbing solution, which as far as possible no longer contains salt crystals, can, in particular, be fed to an absorption unit of a device separating off carbon dioxide.

The specified separation unit has the advantage that salts can be separated off from a scrubbing solution thereby. The separation unit enables the salts dissolved in a scrubbing solution to crystallize out and thus be present as solids in the scrubbing solution, as a result of which they can then be separated from the scrubbing solution by a first separator unit by way of a relatively simple solid/liquid separation. In this process, in addition, the correspondingly high solids concentration within the scrubbing solution in the crystallizer has a beneficial effect on the crystallization performance of the crystallizer.

The second separator unit is expediently constructed as a filter. In this case it can be, in particular, a continuously operating filter, such as, for example, an edge-split filter. Alternatively, the second separator unit can also be constructed as a hydrocyclone, or a separator.

In an expedient embodiment, the first separator unit comprises a centrifuge which can be, in particular, a screen centrifuge. This separates off, in particular, the large salt particles from the scrubbing solution. In addition, the first separator unit can further comprise a filter which separates from the scrubbing solution any medium and small salt crystals still present. Instead of the combination of screen centrifuge and filter, it is, in particular, also possible that the first separator unit comprises, for example, a worm/screen centrifuge, which combines both functions therein.

In an advantageous embodiment, a second branch conduit is connected to the crystallizer, which second branch conduit is returned to the crystallizer via a comminution appliance. Thus scrubbing solution can be withdrawn continuously or periodically from the crystallizer via the second branch conduit and the salt crystals present in the scrubbing solution can be subjected to a comminution process in the comminution appliance, for example a mill or a disperser. The second branch conduit is arranged in such a manner that the comminuted salt crystals can then be fed back to the crystallizer together with the scrubbing solution. In this manner, more small salt crystals can be made available to the crystallizer, which small salt crystals can grow, as a result of which the crystallization performance of the crystallizer is increased.

Within the separation unit, there is advantageously provided a first feed appliance for seed crystals. The seed crystals can be added to the scrubbing solution in the crystallizer. There, they grow by crystallization.

Advantageously, within the separation unit, there is provided a second feed appliance for a base, in particular potassium hydroxide. By addition of a base to the scrubbing medium, protons can be trapped which are formed by the absorption of acid gases and the formation of salts.

Advantageously, downstream of the first separator unit there is connected a "safety" filter. By means of the "safety" filter, salt crystals that were not separated off by the first separator unit can be retained.

BRIEF DESCRIPTION OF THE DRAWINGS

Hereinafter, an exemplary embodiment of the invention will be described in more detail with reference to the accompanying drawing.

In the drawing, the single FIGURE shows diagrammatically a device for separating off carbon dioxide with a separation unit.

DETAILED DESCRIPTION OF INVENTION

In the FIGURE, in a diagrammatic representation, a device 2 for separating off carbon dioxide from the flue gas RG of a combustion plant is shown. The device 2 for separating off carbon dioxide comprises an absorption unit 4 and also a desorption unit 5. The absorption unit 4 is connected via a first conduit 6 for a regenerated scrubbing solution A and via a second conduit 7 for a loaded scrubbing solution A' to the desorption unit 5. Via the second conduit 7, a scrubbing solution A' loaded with carbon dioxide is conducted from the absorption unit 4 to the desorption unit 5 for regeneration. Via the first conduit 6, regenerated scrubbing solution A from the desorption unit 5 is again brought into the absorption unit 4. A separation unit 10 for separating off salts from the regenerated scrubbing solution A is connected into the first conduit 6.

A reboiler 12 is assigned to the desorption unit 5, by way of which reboiler, in the operating case, a process steam D of the combustion plant is conducted for supplying heat. This heat is introduced via a recirculation of the scrubbing solution A into the desorption unit 5, and so scrubbing solution A situated therein is heated to a desorption temperature $T_D$, and so dissolved carbon dioxide is thermally desorbed.

In the operating case, the flue gas RG of the combustion plant is delivered to the absorption unit 4. There, the cool flue gas RG is brought into contact with regenerated scrubbing solution A in counterflow, in such a manner that carbon dioxide present therein is absorbed or dissolved. At an absorption temperature $T_A$, the amine-containing scrubbing solution A has a high loading capacity for carbon dioxide. The flue gas RG freed from carbon dioxide is discharged to the atmosphere.

The carbon dioxide-loaded scrubbing solution A' flows into the desorption unit 5 for regeneration. In the top region of the desorption unit 5, carbon dioxide-rich gas is removed via a gas conduit 15 and conducted via a first heat exchanger 16 and a subsequent compressor 18. Entrained gaseous carbon dioxide is compressed in the compressor 18 and used for further purposes, e.g. injected into an aquifer or conveyed to another carbon dioxide store.

The separation unit 10 for separating off salts from the regenerated scrubbing solution A comprises a crystallizer 20, consisting of a crystallization chamber 21 and a countercurrent classifier 22, and also two separator units 25, 26, and a comminution appliance 30. The first separator unit 25 is connected on the intake side via a third conduit 31 to the countercurrent classifier 22, and on the outlet side via the first conduit 6 to the absorption unit 4. The second separator unit 26 is connected via a first branch conduit 32 on the intake side to the crystallization chamber 22 of the crystallizer 20 and on the outlet side to the countercurrent classifier 22. The comminution appliance 30 is connected via a second branch conduit 34 to the crystallization chamber 21.

The regenerated scrubbing solution A flows, in the operating case, via the first conduit 6 into the crystallization chamber 21 of the crystallizer 20. Before the regenerated scrubbing solution A enters into the crystallization chamber 21, it is cooled via a second heat exchanger 36 to 10° C.-15° C. Owing to this cooling, the solubility of the salts in the regenerated scrubbing solution A decreases and the salts that are to be crystallized out are brought into supersaturation. As a result, the crystal formation of the salts is enabled. In the crystallization chamber 21, principally nucleation and salt crystal growth proceed. In the crystallizer 20, within the regenerated scrubbing solution A, in particular small, medium and large salt crystals are present, wherein this classification must be seen in each case in relation to the salt crystals to one another, that is to say that the small salt crystals are smaller than the medium salt crystals, and the medium salt crystals in turn are smaller than the large salt crystals.

Via the first branch conduit 32 a first substream of regenerated scrubbing solution A and salt crystals is withdrawn from the crystallization chamber 21 of the crystallizer 20 and fed to the second separator unit 26. The second separator unit 26 retains large and medium salt crystals which are situated in the first substream that is withdrawn. These retained salt crystals are fed back via a fourth conduit 38 to the crystallization chamber 21 in order to maintain the high solids concentration within the crystallizer 20. These salt crystals grow further in the crystallizer 20. The first substream then principally only containing small salt crystals is passed into the countercurrent classifier 22 where it acts as a counterflow. This counterflow flows through the countercurrent classifier 22 in the opposite direction to the falling direction of the salt crystals. In this case the velocity of the counterflow is adjusted in such a manner that it is less than the falling velocity of the large salt crystals, but greater than the falling velocity of the medium and small salt crystals. Medium and small salt crystals, the falling velocity of which is less than the velocity of the counterflow, are transported by the counterflow upwards in the direction of the crystallization chamber 21. The large salt crystals, the falling velocity of which is greater than the velocity of the counterflow, fall downwards and collect at the base of the countercurrent classifier 22. A more targeted withdrawal of large salt crystals is thereby possible, which may be separated off more simply from the regenerated scrubbing solution A.

A second substream of scrubbing solution and salt crystals is taken off from the crystallization chamber 21 of the crystallizer 20 via the second branch conduit 34 and fed to the comminution appliance 30. The comminution appliance 30 comminutes the salt crystals present in the second substream. Subsequently, the second substream with the comminuted salt crystals is returned to the crystallization chamber 21. In this manner, more small salt crystals are made available to the crystallizer, which small crystals can grow in the crystallizer (20), as a result of which the crystallization performance of the crystallizer is increased.

Via the third conduit 31, a regenerated scrubbing solution A in particular containing large salt crystals is withdrawn from the base of the countercurrent classifier 22 and fed to the first separator unit 25. This separates off the salt crystals from the regenerated scrubbing solution A. The salt crystals separated off by the first separator unit 25 are fed via a fifth conduit 40 to a store. The regenerated scrubbing solution A that is substantially freed from salts is fed via the first conduit 6 to the absorption unit 4, and in the process heated via a second heat exchanger 42 to the absorption temperature $T_A$.

The invention claimed is:

1. A device for separating off carbon dioxide, comprising:
an absorption unit,
a desorption unit assigned to the absorption unit, and
a separation unit for separating off salts from a scrubbing solution,
wherein the absorption unit and the desorption unit are connected to each other via a first conduit for a regenerated scrubbing solution and a second conduit for a loaded scrubbing solution,
wherein the separation unit comprises a crystallizer for forming salt crystals and a first separator unit on the downstream side thereof for separating off the salt crystals,
wherein the crystallizer comprises a crystallization chamber for forming the salt crystals and a classifying appliance, constructed as a countercurrent classifier, for separating the salt crystals according to their particle size,
wherein a first branch conduit is connected to the crystallization chamber, which first branch conduit opens out into the countercurrent classifier via a second separator unit, where this substream acts as a counterflow,
wherein the second separator unit is adapted to retain large and medium salt crystals, and
wherein the second separator unit is connected to the crystallization chamber via a conduit for supplying the retained salt crystals.

2. The device for separating off carbon dioxide as claimed in claim 1, wherein the separation unit is connected into the first conduit.

3. The device for separating off carbon dioxide as claimed in claim 1, wherein the second separator unit is constructed as a filter.

4. The device for separating off carbon dioxide as claimed in claim 1, wherein the first separator unit comprises a centrifuge.

5. The device for separating off carbon dioxide as claimed in claim 1, wherein a second branch conduit is connected to the crystallizer, which second branch conduit is returned back to the crystallizer via a comminution appliance.

6. The device for separating off carbon dioxide as claimed in claim 1, wherein the device is adapted for separating off carbon dioxide from a flue gas of a fossil-fuelled power plant.

7. A method for separating off carbon dioxide, comprising:
- a loaded scrubbing solution is conducted from an absorption unit to a desorption unit and a regenerated scrubbing solution is conducted from the desorption unit to the absorption unit,
- the scrubbing solution is fed to a separation unit in which, by means of a crystallizer, salt crystals are formed in the scrubbing solution and are separated off by means of a downstream separator unit,
- the salt crystals are formed in a crystallization chamber of the crystallizer and are separated according to their particle size in a classifying appliance of the crystallizer by means of a counterflow,
- a first substream of the scrubbing solution is taken off from the crystallization chamber,
- the first substream is fed as counterflow to the classifying appliance,
- large and medium salt crystals situated in the first substream that has been taken off are retained, and
- the retained salt crystals are fed via a separate conduit into the crystallization chamber.

8. The method for separating off carbon dioxide as claimed in claim 7, wherein the method is adapted for separating off carbon dioxide from a flue gas of a fossil-fuelled power plant.

9. The method as claimed in claim 7, wherein filtration is performed for separating off the salt crystals from the first substream.

10. The method as claimed in claim 7, wherein centrifugation is performed for separating off the salt particles by means of the separator unit.

11. The method as claimed in claim 7, wherein a second substream of the scrubbing solution is taken off from the crystallizer and salt crystals present in the second substream are comminuted, and wherein the second substream is returned back to the crystallizer.

12. A separation unit for separating off salts from a scrubbing solution used in a device for separating off carbon dioxide, comprising an absorption unit and a desorption unit assigned to the absorption unit, wherein the absorption unit and the desorption unit are connected to one another via a first conduit for a regenerated scrubbing solution and a second conduit for a loaded scrubbing solution,
- wherein the separation unit comprises
  - a crystallizer for forming salt crystals, and
  - a first separator unit downstream thereof for separating off the salt crystals,
  - wherein the crystallizer comprises a crystallization chamber for forming the salt crystals and a classifying appliance, constructed as a countercurrent classifier, for separating the salt crystals according to their particle size,
  - wherein a first branch conduit is connected to the crystallization chamber, which first branch conduit opens out into the countercurrent classifier via a second separator unit, where this substream acts as counterflow, and
  - wherein the second separator unit is connected via a conduit to the crystallization chamber for supplying salt crystals which are separated off.

13. The separation unit as claimed in claim 12, wherein the second separator unit is constructed as a filter.

14. The separation unit as claimed in claim 12, wherein the first separator unit comprises a centrifuge.

15. The separation unit as claimed in claim 12, wherein a second branch conduit is connected to the crystallizer, which second branch conduit is returned back to the crystallizer via a comminution appliance.

* * * * *